Patented Dec. 26, 1950

2,535,643

UNITED STATES PATENT OFFICE 2,535,643

PROCESS OF PREPARING VINYL RESIN PLASTICIZED SHEETS

Gerry P. Mack, Jackson Heights, N. Y., assignor to Advance Solvents and Chemical Corporation, a corporation of New York No Drawing. Application July 22, 1947, Serial No. 762,819

7 Claims. (Cl. 260—31.8)

This invention relates, in general, to polyvinyl halide compositions and, more particularly, to plasticizers which produce useful and unusual properties when used in combination with polyvinyl halide resins.

It is well known that polyvinyl halide polymers or resins generally have to be plasticized with various materials before they can be used successfully in manufacturing processes. This is particularly true in manufacturing what is known as highly plasticized compositions which are used for self-supporting films made from polyvinyl halide compositions, as well as compositions to be used on cloth and paper and, further, for extrusion purposes such as in the manufacture of belts, hose, etc. In the past, it has been recognized generally that in order for a plasticizer to be useful for use with polyvinyl halide compositions it not only must have high solvent power for such polyvinyl halides, but also have a high boiling point and low viscosity. Further, it has been generally assumed that if the solvent power is low the plasticizing effect in the compound is greatly decreased, the tensile strength is low and the plasticizers tend to exude from the compositions. The most commonly used plasticizers have been esters, ketones and ethers, but the greater proportion has been in the esters and particularly esters of dicarboxylic acids, such as sebacic, azelaic, adipic and phthalic acids. Not all esters of these acids are suitable as plasticizers however.

The plasticizers based on phthalic anhydride in order to be suitable for use with polyvinyl halide compositions must have a high boiling point or low volatility so that when these compositions are worked at elevated temperatures the plasticizer does not disappear nor volatilize during processing. In general, in the phthalic esters used as plasticizers, the alkyl groups must contain no less than 4 carbon atoms and preferably 8 carbon atoms in the molecule to be suitable. Further, the alkyl group should be preferably of a straight chain for maximum plasticizing efficiency.

It is well known that the normal octyl group is more suitable than the branched chain 2 ethylhexyl group and produces a better plasticizer.

In the past, it also has been known that as soon as a hydroaromatic radical is introduced into phthalic esters the plasticizing efficiency is greatly decreased and the products become crystalline instead of fluids of low viscosity which make suitable plasticizers. For instance, dicyclohexyl phthalate, which is made by esterifying one mol of phthalic anhydride with two mols of cyclohexanol, has the property of being a high boiling plasticizer, which is highly suitable for nitrocellulose and other high polymers, but is unsuitable as a plasticizer for polyvinyl halide polymers. In the first place, it is a highly crystalline solid having a melting point of 58° C. Secondly, when this ester is used in combination with polyvinyl halide resins it is not even compatible and gives white, opaque films instead of clear transparent films as is desired for suitable plasticizers.

I have now discovered a class of phthalic ester plasticizers which contain cyclohexanol, methyl cyclohexanol and other hydroaromatic alcohols in the radical but at the same time give good plasticizing efficiency, are non-crystalline and are well adapted to use with polyvinyl halide resins.

In general, my class of plasticizers comprises a mixed ester of phthalic anhydride in which the ratio of hydroaromatic alcohol is not more than 1–1.2 mols to 1 mol of phthalic anhydride, the balance being an aliphatic alcohol having not less than 4 carbon atoms. Practically, of course, the product contains a mixture of the hydroaromatic diester and the hydroaromatic aliphatic mixed diester. Such esters can be prepared in the usual way; that is, phthalic anhydride is first esterified with the hydroaromatic alcohol to the desired extent and the residual carboxylic group is esterified with the aliphatic alcohol. After esterification is completed, which can be determined by the usual laboratory methods, the ester is stripped, bleached, etc., to give a product which is non-crystalline and which does not crystallize at room temperature.

Such esters are not only active plasticizers for polyvinyl halide resins but are unique in the respect that they have the desirable property of being very powerful plasticizers as the temperature is gradually increased and at high temperatures are very active plasticizers which combine to give vinyl halide compositions which are readily calendered and milled even though large quantities of this plasticizer are used. Additionally, such compositions do not become short nor crumbly on the calender or mill, which happens if the straight dialkyl ester of phthalic anhydride is used.

Compositions made with my new plasticizer have the usual chemical resistance as such polyvinyl halide compositions and can be used for various purposes. Such compositions or stocks can be made with varying physical properties depending on proportion of plasticizer used, although I prefer to use from ¼ to 5 parts by weight of plasticizer to one of the resin. These compositions can be compounded further with the usual pigments and fillers that are ordinarily used such as clay, barytes, titania, carbon black, whiting, etc. These are the types of fillers and pigments which are usually used in the rubber and plastic industries and also may be used in my composition. Further, stabilizers such as complex tin salts like dibutyl tin diacetate, epoxy compounds such as glycidyl oleate, lead stearate and other metallo organic compounds which function as stabilizers can be used in my compositions. Further, my plasticizers can also be used in combination with the other common plasticizers, such as phthalic, sebacic, adipic, fatty and other esters, to give other desirable properties associated with those plasticizers.

As to the polyvinyl halide polymers, any of the usual commercial polymers, such as polyvinyl chloride, or copolymers of vinyl chloride with minor proportions of vinyl esters, such as vinyl acetate or vinyl cyanide, or acrylic esters, may be satisfactorily plasticized with my compounds.

Specifically, in my phthalate esters the molar ratio of hydroaromatic-aliphatic alcohols is preferably in the range of 1 to 1.2 mols of hydroaromatic alcohols to 1 to 0.8 mols of aliphatic alcohol per 1 mol of phthalic anhydride.

As hydroaromatic alcohols, I can use cyclohexanol, methyl cyclohexanol, dimethyl cyclohexanol, ethyl cyclohexanol, cyclohexyl-cyclohexanol. Also, Exocyclic hydroaromatic alcohols as:
  Cyclohexyl carbinol
  Cyclohexyl ethyl alcohol
  Cyclohexyl propyl alcohol
Aliphatic alcohols such as:
  Butyl alcohol
  Amyl alcohol
  Hexyl alcohol
  Heptyl alcohol
  Octyl alcohol
  Decyl alcohol
  Sec. amyl alcohol
  Methyl isobutyl carbinol
  Diisopropyl carbinol
  2 methyl pentanol-1
  2,4 dimethyl pentanol-1
  2,4 dimethyl hexanol-3
Ether alcohols such as:
  Ethyleneglycol monomethyl ether
  Ethyleneglycol monoethyl ether
  Ethyleneglycol monobutyl ether
  Ethyleneglycol mono 2 ethylbutyl ether Also the corresponding diethyleneglcyol ethers are considered suitable.

To further illustrate the type of plasticizer that I have discovered, the general formula can be applied:

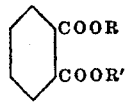

where R represents one of the above hydroaromatic radicals and R' one of the aliphatic radicals.

The following examples will illustrate the type of compound and are purely for illustrative purposes and are not included for the purpose of limiting the invention.

*Example 1*

Monocyclohexyl phthalate, prepared from 1 mol phthalic anhydride and 1 mol cyclohexanol, was further esterified using n. butanol until a neutral diester was obtained, which boiled at 210–220° C. at 5 mm. pressure and had a saponification value of 369.

*Example 2*

1 mol phthalic anhydride and 1 mol n. decanol were reacted and the esterification completed using cyclohexanol. The neutral diester obtained boiled at 268–278° C. at 5 mm. pressure and had a saponification value of 288.

*Example 3*

As in Example 1, the monocyclohexyl phthalate was prepared and the esterification finished using 2 ethylhexanol. The neutral diester, which was obtained after working up in the usual way the crude product, boiled at 238° C. at 5 mm. having a saponification value of 311.

*Example 4*

In a similar manner, a neutral phthalic acid ester was prepared using 1.2 mols cyclohexanol and 0.8 mols methyl isobutyl carbinol for 1 mol phthalic anhydride. The crude ester was worked up and a neutral product was obtained boiling at 220–230° C. at 5 mm. pressure having a saponification value of 338.

*Example 5*

1 mol phthalic anhydride was esterified using a molal ratio of 1.2 mols cyclohexanol and 0.8 mols diisopropyl carbinol. The crude ester was purified and the neutral diester boiled at 210–220° C. at 4 mm. pressure and had a saponification number of 327.

*Example 6*

A neutral phthalic acid ester was prepared using 1 mol of cyclohexanol and 1 mol of butoxyethyleneglycol. The neutral ester obtained after proper purification boiled at 238° C. at 5 mm. pressure and had a saponification value of 322.

To further illustrate the products of this invention, the following table summarizes the physical constants of some of the plasticizers prepared.

| Plasticizer | B. P. @ 5 mm. | Sap. value | Crystallization point | Viscosity @ 25° C. in centipoise |
|---|---|---|---|---|
| | °C. | | °C. | |
| Dicyclohexyl Phthalate | 237 | 339 | +58 | Solid |
| Cyclohexyl n. Butyl Phthalate | 210–220 | 369 | −20 | 65 |
| Cyclohexyl n. Decyl | 268–278 | 288 | −25 | 65 |
| Cyclohexyl 2 Ethyl Butyl Phthalate | 230 | 338 | −12 | 225 |
| Cyclohexyl 2 Ethyl Hexyl Phthalate | 238 | 311 | −15 | 125 |
| Cyclohexyl Methyl Isobutyl Carbinyl Phthalate | 220–230 | 338 | −8 | 370 |
| Cyclohexyl Diisopropyl Carbinyl Phthalate | 210–220 | 327 | −5 | 2270 |
| Cyclohexyl Butoxyethyl Phthalate | 238 | 322 | −18 | 65 |

The following examples further illustrate my invention and the new properties of my plasticizers:

| Composition | #1 | #2 | #3 | #4 |
|---|---|---|---|---|
| VYDR Resin | 100.0 | 100.0 | 100.0 | 100.1 |
| Calcium Stearate | 2.0 | 2.0 | 2.0 | 2.0 |
| Stearic Acid | 0.5 | 0.5 | 0.5 | 0.5 |
| Dicyclohexyl Phthalate | 55.0 | | | |
| Cyclohexyl Methyl Isobutyl Carbinyl Phthalate | | 55.0 | | |
| Cyclohexyl 2-Ethyl Butyl Phthalate | | | 55.0 | |
| Tricresyl Phosphate | | | | 55.0 |

| | #1 | #2 | #3 | #4 |
|---|---|---|---|---|
| T. S. | | 2,745 | 3,000 | 3,150 |
| Modulus @ 100 per cent | | 2,000 | 1,600 | 1,780 |
| Elongation, per cent | | 190 | 325 | 285 |
| Set, per cent | | 32 | 34 | 27 |
| Shore Hardness | | 100 | 90 | 85 |
| Cold Crack, °F | | −80 | −40 | 0 |
| Sheet Transparency | Opaque | Clear | Clear | Clear |

Dicyclohexyl phthalate was incompatible with the vinyl resin and gave a stiff white opaque sheet on which it was impossible to conduct physical tests.

VYDR is the trade name of Bakelite Corporation's polyvinyl chloride acetate (95% V. C.–5% V. A.) resin with an intrinsic viscosity of 20° C. of 1.25 in cyclohexanone.

The ingredients in the compositions given in the above table were thoroughly blended as per usual practice, then milled on a two-roll rubber mill with a roll temperature of 300–312° F. and then moulded for ten minutes at 305° F. The usual physical properties were then run on these specimens and the results are given in the above table.

What is claimed is:

1. A process for preparing a clear, resilient, self-sustaining composition of matter which comprises milling and calendering at a temperature of about 300° F. 1 part of a polyvinyl-chloride-acetate resin having an approximate intrinsic viscosity at 20° C. of 1.25 in cyclohexanone, with ¼ to 5 parts of a plasticizer which is per se compatible with and a solvent for said resin, said plasticizer being a mixed phthalate ester prepared by reacting 1 mol of phthalic anhydride with 1–1.2 mols of a hydroaromatic alcohol and 0.8–1 mol of an aliphatic alcohol having 4–12 carbon atoms.

2. The process of claim 7 in which the hydroaromatic alcohol is cyclohexanol and the aliphatic alcohol is 2-ethyl hexanol.

3. The process of claim 7 in which the hydroaromatic alcohol is cyclohexanol and the aliphatic alcohol is n. butanol.

4. The process of claim 7 in which the hydroaromatic alcohol is cyclohexanol and the aliphatic alcohol is n. decanol.

5. The process of claim 7 in which the hydroaromatic alcohol is cyclohexanol and the aliphatic alcohol is methyl isobutyl carbinol.

6. The process of claim 7 in which the hydroaromatic alcohol is cyclohexanol and the aliphatic alcohol is diisopropyl carbinol.

7. A process for preparing a clear, resilient, self-sustaining composition of matter which comprises milling and calendering at a temperature of about 300° F. 1 part of a vinyl chloride-vinyl acetate copolymer with ¼ to 5 parts of a plasticizer which is per se compatible with and a solvent for said resin, said plasticizer being a mixed phthalate ester prepared by reacting 1 mol of phthalic anhydride with 1–1.2 mols of a hydroaromatic alcohol and 0.8–1 mol of an aliphatic alcohol having 4–12 carbon atoms.

GERRY P. MACK.

REFERENCES CITED

The following references are of record in the file of this patent:

UNITED STATES PATENTS

| Number | Name | Date |
|---|---|---|
| 1,643,393 | Reid et al. | Sept. 27, 1927 |
| 2,384,521 | Andersen et al. | Sept. 11, 1945 |

FOREIGN PATENTS

| Number | Country | Date |
|---|---|---|
| 349,100 | Great Britain | May 21, 1931 |